(12) United States Patent
O'Brien

(10) Patent No.: US 6,271,533 B1
(45) Date of Patent: Aug. 7, 2001

(54) METHOD AND AN ELECTRONIC DEVICE FOR REPELLING INFRARED-SENSITIVE SNAKES

(76) Inventor: Denis Richard O'Brien, P.O. Box 544, Charlottesville, VA (US) 22902

(*) Notice: Subject to any disclaimer, the term of this patent is extended or adjusted under 35 U.S.C. 154(b) by 0 days.

(21) Appl. No.: 09/347,718

(22) Filed: Jul. 6, 1999

(51) Int. Cl.$^7$ ............................................. G01J 1/00
(52) U.S. Cl. ..................... 250/504 H; 250/504 R; 250/492.1; 250/494.1; 250/495.1
(58) Field of Search .................. 250/504 R, 492.1, 250/494.1, 495.1, 504 H

(56) References Cited

U.S. PATENT DOCUMENTS

| | | | |
|---|---|---|---|
| 3,926,149 | * 12/1975 | Berger | 119/1 |
| 4,286,405 | 9/1981 | Howard | 43/87 |
| 4,301,996 | 11/1981 | Holyoak | 256/1 |
| 5,104,900 | 4/1992 | Tennyson | 514/765 |
| 5,170,503 | 12/1992 | Hightower et al. | 2/22 |

OTHER PUBLICATIONS

Gamon & Harris. The Infrared Receptors of Snakes. Scientific America, May, 1973, pp94–100.

* cited by examiner

*Primary Examiner*—Bruce C. Anderson
*Assistant Examiner*—Nikita Wells
(74) *Attorney, Agent, or Firm*—Denis R. O'Brien, Esq.

(57) ABSTRACT

A method and a device for repelling pit vipers (rattlesnakes, copperheads, water moccasins) and boids (pythons, anacondas, boa constrictors) are disclosed whereby the snakes are irradiated with IR radiation having an appropriate wavelength and intensity to stimulate the IR-receptors of the snakes, thereby "jamming" the IR-receptors and/or producing an inimical electromagnetic environment that the snakes cannot tolerate.

11 Claims, 1 Drawing Sheet

US 6,271,533 B1

METHOD AND AN ELECTRONIC DEVICE FOR REPELLING INFRARED-SENSITIVE SNAKES

FIELD OF THE INVENTION

The field of the invention comprises processes and electronic devices used to repel snakes, and more particularly, those species of snake that are sensitive to infrared (IR) radiation, which are referred to herein as "IR-sensitive snakes."

BACKGROUND OF THE INVENTION

Of the more than 2700 species of snakes, a few are IR-sensitive, that is, they have evolved specialized receptors by which they can detect and respond to electromagnetic radiation in the IR range.

All IR-sensitive snakes pose dangers to humans. At least eighteen species are venomous. The venomous IR-sensitive snakes are collectively known as the "pit vipers" and are divided among three genera of the family Viperidae: Agkistrodon, Crotalus, and Sistrurus. Copperheads and cottonmouths comprise the genus Agkistrodon, while the rattlesnakes comprise the genera Crotalus and Sistrurus.

All pit vipers are distinguished by an indentation, or "pit"—one below each eye—which contains numerous receptors that detect IR radiation. Pit vipers are also distinguished by their propensity for attacking suddenly and by their ability to deliver venoms comprised of mixtures of various hemotoxins and/or neurotoxins.

Pit vipers are distributed throughout much of North America, Central America, and South America; they account for virtually all venomous snake bites in the United States. About 1000 rattlesnake bites occur each year in the United States; about 3% are fatal. The Western Diamondback rattlesnake (*Crotalus atrox*) is responsible for the greatest number of fatal snake bites in the United States. The numbers of attacks and the numbers of fatalities are increasing each year.

A second snake family, Boidae, includes the remaining known IR-sensitive species: boa constrictors, pythons, and anacondas. These snakes are found in sub-tropical areas of the world, and they all have IR-sensitive receptors lining their upper and lower lips. Generally docile, these snakes attain enormous size, and while they are not venomous, they do occasionally attack and kill humans, as well as pets and domestic animals. They are, not unreasonably, considered a menace in those parts of the world where they are common.

Although most rational humans try to avoid contact with pit vipers and boids, the habitats of these snakes are becoming increasingly susceptible to human encroachment. Furthermore, in many areas, such as national forests and parks, pit viper and boid populations are increasing as a result of government protection statutes and programs. Consequently, in some areas there is a reasonable likelihood of untoward interactions occurring between IR-sensitive snakes and humans. Coming upon these snakes unexpectedly can be a frightening experience and people often react reflexively to beat or stomp the snake. Such responses can enrage and/or injure the animal unnecessarily and often lead to the human being bitten.

At present, a safe, reliable and convenient means of repelling pit vipers and boids without risk of injury to the person and/or the snake is not available. Those who frequent areas in which pit vipers and boids are prevalent would benefit from an easily portable device with which one can repel IR-sensitive snakes without coming into close proximity with the snakes. Likewise, property owners would benefit from a device with which they can exclude dangerous pit vipers or boids from their property without excluding harmless snakes, which control vermin.

DESCRIPTION OF THE PRIOR ART

A snake guard has been patented by Hugh K. Holyoak (U.S. Pat. No. 4,301,996,Nov. 1981). This is essentially just a net affixed in a vertical orientation in the presumed path of a snake. Any snake that sticks its head in the net becomes ensnared. Presumably, a person is then required to remove the snake from the net, an unenviable chore indeed should the ensnared snake be a pit viper or seventy-five pound boid. Furthermore, this guard ensnares not just venomous snakes, but all species, including those that are beneficial. Also, the Holyoak invention is of no use to one walking or hiking through areas infested by venomous snakes.

A similar approach is taken by Walter K. Howard's pit viper trap (U.S. Pat. No. 4,286,405, September, 1981). This patent describes a noose arranged at the opening of an elongated cage in such a way that the triangular head of a pit viper will become ensnared in the noose as the snake enters the cage. While the inventor claims that this invention will selectively ensnare pit vipers, a person must nevertheless come into close proximity to the snake in order to remove it from the noose, presumably by killing it first. Thus, the ultimate effect of the invention is to bring the person and the ensnared pit viper into direct contact. This is not an entirely satisfactory situation. Furthermore, this invention is of little or no value to those walking in snake-infested areas.

A chemical snake repellant has been patented by Tennyson (U.S. Pat. No. 5,104,900, Apr. 1992). This repellant, comprised of naphthalene, sulfur, and montmorillonite, is sprinkled on the ground in an area from which snakes are to be repelled. When the snake encounters the mixture, the snake is repelled. This approach to the problem has obvious drawbacks in terms of the toxicity of the repellant to other animals and to humans. Furthermore, this approach repels not just venomous snakes, but all species, including those that are beneficial, nor is it beneficial to one wishing to avoid a snake bite while walking or hiking thorough areas infested by venomous snakes.

A variety of leggings and other protective garments have been devised to offer protection to those walking or hiking though snake infested areas. A patent issued to Hightower et al. (U.S. Pat. No. 5,170,503,Dec. 1992) for snake bite-resistant chaps is representative of this approach to the problem. By wearing such protective garments while traversing known snake-infested territory, the wearer is protected from snake bites, as long as the snake doesn't bite an area not protected by the garment. However, such garments are effective if, and only if, the person is actually attacked by a snake, which is a scenario most persons would prefer to avoid altogether.

As a last resort, snake bite kits are well known and have been used for generations as a means of extracting venom from wounds inflicted by a pit vipers. Such kits are particularly advantageous when used in conjunction with inventions that require the person to come into close proximity to the snake.

SUMMARY OF THE INVENTION

The present invention represents a remedy to the foregoing problems and an improvement over the prior art by providing a method and an electronic device for repelling IR-sensitive snakes from a safe distance; i.e., a distance that is safe both from the human's perspective and from the snake's perspective. This is done by "over-loading" the IR-receptors of the snakes with IR-radiation.

Pit vipers and boids use their IR-receptors to locate prey and to sample the ambient temperature in order to facilitate thermoregulation. The IR-receptors are very sensitive, surpassing the best man-made IR detectors in terms of sensitivity and response time. For example, the response time of boa constrictor IR-receptors has been measured at 35 milliseconds, and IR-radiation having a differential intensity of just 0.1 watt/cm$^2$ over ambient is sufficient to stimulate the pit-receptors of a rattlesnake. The "temperature window" of sensitivity of the IR-receptors is about 25° C.–70° C., which corresponds to the wavelength band of 10 $\mu$m–6 $\mu$m. Birds and mammals, normal prey for both pit vipers and boids, emit IR radiation at about 9 $\mu$m.

By stimulating the snake's IR-receptors with electromagnetic radiation of an appropriate wavelength and sufficient power density, one can immobilize and/or repel IR-sensitive snakes. The result of stimulating the snakes' IR-receptors is to momentarily "blind" or "jam" the snakes' IR-detection system in a manner analogous to the way a bright light blinds human vision. IR radiation of the appropriate wavelength and intensity also makes the ambient temperature appear to the snakes to be dangerously high, thereby repelling the snake. A further advantage of the present invention is that rattlesnakes lurking in shadows or undergrowth can be located at a distance because they begin to "buzz" when exposed to the IR radiation.

OBJECTS OF THE INVENTION

The objects of the invention are as follows:

One object of the invention is to provide a safe and effective method and device for repelling an IR-sensitive snake without getting close to the snake and without touching or harming the snake;

Another object of the invention is to provide a safe and effective method and device for scanning areas that are inaccessible to visual inspection in order to detect the presence of rattlesnakes;

Another object of the invention is to provide a safe and effective method and device for continuously or periodically clearing IR-sensitive snakes from areas frequented by humans.

BRIEF DESCRIPTION OF THE DRAWINGS

The above and other objects, features and advantages of the invention will become more apparent from the following description taken in connection with the accompanying drawings, in which.

REFERENCE NUMERALS IN DRAWINGS

| | | |
|---|---|---|
| 100 Case | 102 Clip | 104 Switch |
| 106 Power source | 108 Laser | 110 First focusing lens |
| 112 IR source | 114 Second focusing lens | 200 Case |
| 202 Motor unit | 204 Rotatable connector | 206 Lens |

DETAILED DESCRIPTION OF THE PREFERRED EMBODIMENTS OF THE INVENTION

First Preferred Embodiment of the Method Encompassed by the Invention

One preferred embodiment of the method of the present invention is to irradiate an IR-sensitive snake with IR radiation having a wavelength of approximately from 6 $\mu$m to 10 $\mu$m and a power density of approximately from 0.0015 cal/cm$^2$/sec to 0.0035 cal/cm$^2$/sec at the point at which the radiation comes into contact with the snake's IR receptors.

Second Preferred Embodiment of the Method of the Invention

A second preferred embodiment of the method of the present invention is to scan an area in which the presence of IR-sensitive snakes is suspected or anticipated with IR radiation having a wavelength of approximately from 6 $\mu$m to 10 $\mu$m and a power density of approximately from 0.0015 cal/cm$^2$/sec to 0.0035 cal/cm$^2$/sec at the point at which the radiation comes into contact with the snake's IR receptors.

Third Preferred Embodiment of the Method of the Invention

A third preferred embodiment of the method of the present invention is to locate and/or repel IR-sensitive snakes from an area by sweeping the area periodically or continuously with IR radiation having a wavelength of approximately from 6 $\mu$m to 10 $\mu$m and a power density of approximately from 0.0015 cal/cm$^2$/sec to 0.0035 cal/cm$^2$/sec at the point at which the radiation comes into contact with the snake's IR receptors.

First Preferred Embodiment of the Device of the Invention

A first preferred embodiment of the device encompassed by the invention is a handheld, readily portable device that can be carried into the field and used to irradiate IR-sensitive snakes that may be encountered. The device is capable of emitting an IR beam having a wavelength of approximately from 6 $\mu$m to 10 $\mu$m and a power density of approximately 0.0015 cal/cm$^2$/sec to 0.0035 cal/cm$^2$/sec at a distance of approximately 10 meters from the device, the device being trigger-activated and sufficiently portable that it is easily carried by a person and hence provides personal protection against IR-sensitive snakes for hikers, ranchers, mine inspectors and others who frequent areas inhabited by such snakes. In addition to emitting radiation in the IR range, activation of the trigger mechanism of the device also results in the activation of a laser that emits a beam of visible light to assist in aiming the IR beam.

Figure 1:
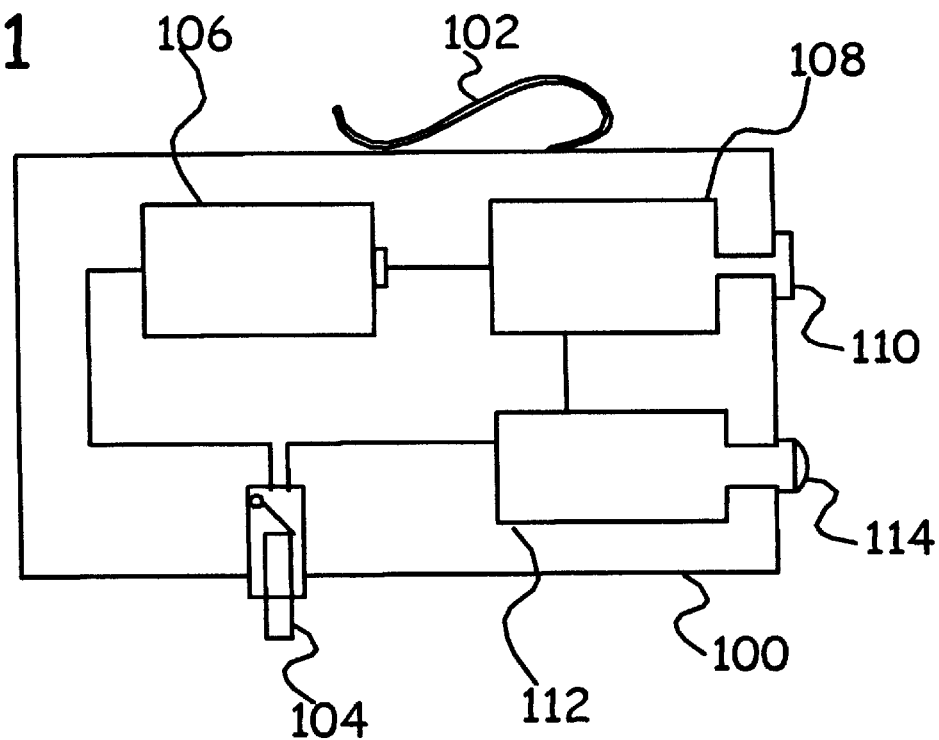
FIG. 1. is a schematic of a hand-held, portable embodiment of the invention.

FIG. 1 is a schematic drawing of such a device showing a case 100 enclosing a laser that produces a beam of visible light 108, an IR-source for producing a beam of IR radiation 112 and an on/off switch 104, all connected in series with a power source 106, which is a standard 12 volt battery small enough to be easily carried. The device also includes a first focusing lens 110 for focusing the visible light beam and a second focusing lens 114 for focusing the IR beam such that it produces a power density of approximately 0.0025 cal/cm$^2$/sec or greater at approximately 10 meters. Depending on the IR source employed, it may also be desirable to provide a filter for restricting the IR radiation to a wavelength in the range of 6 μm–10 μm. This is easily accomplished with commonly available optical filters.

The device also comprises a clip 102 for attaching the device to a belt; however, other ways of conveniently carrying the device in a ready position are anticipated, for instance a wrist lanyard.

When a rattlesnake or other IR-sensitive species is encountered, switch 104, normally in the open position, is depressed, the circuit is closed and current flows from the power source, activating the IR-source and the laser. The IR-source emits a beam of electromagnetic radiation of the appropriate wavelength and intensity, and the beam of visible light produced by the laser is used to aim the IR-beam at the snake. The snake is forthwith repelled by the inimical electromagnetic environment produced by the invention.

All of the components that comprise the foregoing device are well known and widely used in electronics and optics. The source of the visible light aiming beam is a small laser widely available and commonly used for pointing and aiming purposes. The source of the IR beam is a tungsten bulb assembly, which emits a broad spectrum of radiation, including near-to-middle IR radiation. Alternatively, lasers emitting IR in the desired wavelength are currently being developed and it is anticipated that once perfected they will be readily adaptable to the present invention. If an IR-source is chosen having a sufficiently broad spectrum so that it also emits in the visible range, the separate visible light-source 108 may be dispensed with.

Second Preferred Embodiment of the Device of the Invention

Figure 2:
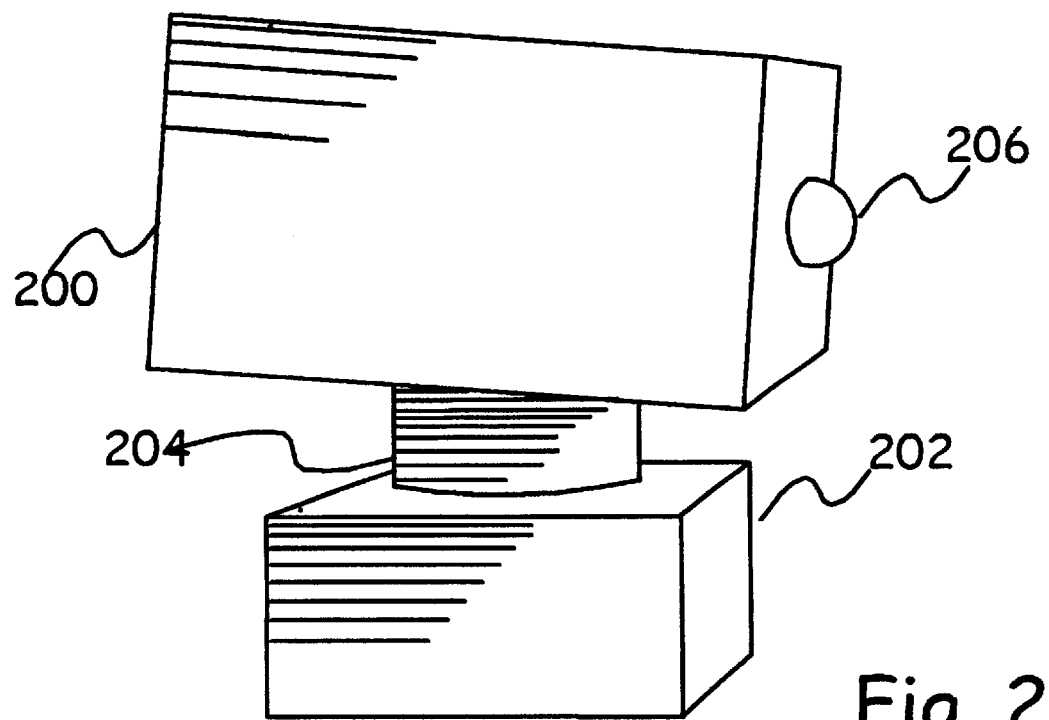
FIG. 2. is a perspective drawing of a fixed and rotatable embodiment of the invention.

A second preferred embodiment of the device encompassed by the present invention, illustrated in FIG. 2, is capable of emitting IR radiation having a wavelength of approximately from 6 μm to 10 μm and a power density of at least approximately from 0.0015 cal/cm$^2$/sec to 0.0035 cal/cm$^2$/sec at a distance of from 3 meters to 30 meters from the device, the device being located at a fixed situs and either aimed in a fixed direction or capable of rotating about a vertical axis so as to sweep an area with the IR radiation and thus repel IR-sensitive snakes that enter into the area being swept. The device may be controlled by a standard on/off switch or a timer-controlled activating means. For example, the device may be set to be activated on a cycle so that the area from which IR-sensitive snakes are to be repelled is exposed to one 360° sweep every two hours with a sweep rate of 6°/minute.

This second preferred embodiment of the device comprises an IR source (not shown) housed in a weather-proof case 200 to which is attached a focusing lens 206 to insure that the IR radiation emitted is sufficiently focused to provide a power density of approximately 0.0015 cal/cm$^2$/sec to 0.0035 cal/cm$^2$/sec at a distance of 9 meters. The circuitry and internal components of this second embodiment are not shown and are essentially as shown if FIG. 1 except that the power source may be external, such as 110 volt line voltage, battery or solar cell.

The housing case 200 may be pivoted or tilted about an axis parallel to the ground so as to adjust the beam of the IR source so that it hits the ground as near or as far from the case as the user may decide is optimum. The case 200 is attached to a motor unit 202 by means of a rotatable connector 204 so that the case 200 may be rotated by the motor unit 360° about an axis that is vertical to the ground. The result of rotating the device in the tilted position is that as the case rotates, the IR beam sweeps an annular area having an area of approximately 1 meter to 9 meters. Alternatively, the device may be set so as to sweep back and forth without rotating completely, thus sweeping an arc. A third alternative is to have the case 200 fixed so that it is directed toward one direction constantly.

The IR source of this embodiment is a tungsten bulb or a laser capable of emitting radiation of the desired wavelength. The mechanism for rotating the case 200 is commonly used to provide rotatable surveillance cameras and is well known to anyone skilled in the art of electronic surveillance. All of the components that comprise the device are well known, widely available and can be easily assembled and used by one skilled in the art.

When the device is activated by the activating means, current flows through the IR-source causing it to emit IR radiation of the desired wavelength and intensity. Due to the rotation of the tilted housing, the radiation sweeps an annular path upon the ground, thereby irradiating any snakes within the area so swept. IR-sensitive snakes are repelled from the area due to the inimical electromagnetic environment produced by the IR radiation. Snakes that are not IR-sensitive are not affected.

SUMMARY, RAMIFICATIONS AND SCOPE

The reader will immediately see from the foregoing that the present invention provides a method and a device for repelling pit vipers and boids from a safe distance, either on an ad hoc basis by irradiating the snake with IR radiation, or prophylacticly by maintaining an electromagnetic environment that is inimical to the snake. The invention affords many advantages over the prior art in that

- it reduces human injuries and deaths by eliminating the need for persons to come into close proximity to potentially lethal pit vipers and boids;
- it obviates the need to kill pit vipers and boids;
- it allows one to detect rattlesnakes in situations in which the snakes cannot be visually perceived;
- it permits the selective exclusion of dangerous pit vipers and boids from an area without excluding harmless species that are beneficial.

It is to be understood that the present invention is not limited to the precise details of structure and function shown and set forth in this specification, for from this description many modifications will occur and be obvious to those skilled in the art. The presently available data suggest that optimum results are obtained by IR radiation having the values specified above; however, other wavelengths and power densities capable of achieving the objects of the invention may be discovered without undue experimentation simply by exposing various species of IR-sensitive snakes to electromagnetic radiation of varying wavelengths and power densities.

Thus the scope of the invention should be determined by the claims below and their legal equivalents, rather than by the examples given.

What I'm claiming is:

1. A method of repelling an IR-sensitive snake by irradiating the snake with electromagnetic radiation that has an appropriate wavelength and a sufficient power density to activate the IR-receptors of the snake.

2. The method of claim 1 wherein the wavelength of the electromagnetic radiation is approximately from 6 $\mu$m to 10 $\mu$m.

3. The method of claim 1 wherein the power density of the electromagnetic radiation at the point at which it comes into contact with the IR-receptors is approximately from 0.0015 cal/cm$^2$/sec to 0.0035 cal/cm$^2$/sec.

4. A device for repelling IR-sensitive snakes comprising: a first means for producing electromagnetic radiation that has an appropriate wavelength and a sufficient power density to activate the IR-receptors of the snakes, and a case enclosing said first means.

5. A device of claim 4 wherein the wavelength of the electromagnetic radiation is approximately from 6 $\mu$m to 10 $\mu$m.

6. The device of claim 4 wherein the power density of the electromagnetic radiation at the point at which it comes into contact with the IR-receptors is approximately from 0.0015 cal/cm$^2$/sec to 0.0035 cal/cm$^2$/sec.

7. The device of claim 4 further including an activating means.

8. The device of claim 7 wherein said activating means is an on/off switch.

9. The device of claim 7 wherein said activating means is timer-controlled.

10. The device of claim 4 further including a switchable light-emitting means for visually aim the electromagnetic radiation.

11. The device of claim 4 further including a rotating means for rotating said case about an axis that is substantially vertical with respect to the ground.

* * * * *